United States Patent [19]

Kobayashi

[11] Patent Number: 4,786,988
[45] Date of Patent: Nov. 22, 1988

[54] METHOD AND DEVICE FOR RECORDING CONTROL SIGNALS FOR HIGH-SPEED CONTACT PRINTING

[75] Inventor: Toshiharu Kobayashi, Tokyo, Japan
[73] Assignee: Sony Corporation, Tokyo, Japan
[21] Appl. No.: 867,913
[22] Filed: May 29, 1986
[51] Int. Cl.$^4$ .............................................. G11B 5/09
[52] U.S. Cl. ......................................... 360/40; 360/45
[58] Field of Search ..................... 360/40, 45, 27, 16

[56] References Cited

U.S. PATENT DOCUMENTS 4,167,761  9/1979  Best ....................................... 360/45

Primary Examiner—Vincent P. Canney
Attorney, Agent, or Firm—Lewis H. Eslinger; Jay H. Maioli

[57] ABSTRACT

A mother tape is adapted to perform magnetic or thermal high-speed contact printing for duplicating video data or information to be reproduced in a VTR monitor with eliminating spike noise otherwise contained in the reproduced control signal. The mother tape stores video information including control signals. The control signals have a waveform which has a first level immediately following the leading edge and lower than a second level corresponding to the normal high level, and a third level immediately following the trailing edge and higher than a fourth constant level corresponding to the normal low level. The first- and third-level waveform "buffers" thus created tend to suppress the spike noise conventionally occurring at the leading and trailing edges of the reproduced control signal and ensure more reliable tracking, tape speed control and so forth.

13 Claims, 2 Drawing Sheets

METHOD AND DEVICE FOR RECORDING CONTROL SIGNALS FOR HIGH-SPEED CONTACT PRINTING

BACKGROUND OF THE INVENTION

The present invention relates generally to high-speed contact printing technique for duplicating video information recorded on a master tape. More specifically, the invention relates to a method and device for recording control signals on a sub-master tape, e.g. a mirror sub-master tape duplicated from a master tape. In more detail, the invention relates to a method and to circuitry specifically designed to record control signals on a mirror sub master tape while eliminating noise spikes from control signals picked up off a slave tape on which the video information is to be printed by high-speed contact printing.

Contact printing is a well-known technique for video information duplication. As is well known, contact printing involves establishing close contact between a sub-master tape and a slave tape and applying a printing bias, in particular a magnetic printing bias, thermal printing bias or the like. In contact printing, video information including control signals is copied from a mother tape to a slave tape at a relatively high speed.

A mirror sub-master tape has to be prepared for contact printing. The track pattern of this mirror tape is the reverse of the normal video tape track pattern so that the normal track pattern reappears on the slave tape.

The control signals recorded on the control signal track of the slave tape are generally in the form of rectangular pulses. When these rectangular-pulse control signals are duplicated from a slave tape, the waveform on the reproduced signal is differentiated so that rising edges of the master become spikes and so on. The reproduced control signal spikes tend to be accompanied by harmonic noise at their leading and trailing edges. This noise can cause mis-triggering which may cause errors in tracking or in tape speed selection.

SUMMARY OF THE INVENTION

Therefore, it is an object of the present invention to provide a sub-master tape for high-speed contact printing which can suppress spike noise in the reproduced waveform of the control signal reproduced from a duplicated slave tape.

Another object of the present invention is to provide a method for recording control signals on a sub-master tape, which method is specifically designed to produce a control signal waveform capable of eliminating spike noise which would otherwise arise during reproduction of the video information duplicated on the slave tape.

A further object of the present invention is to provide circuitry specifically designed to implement the method according to the invention.

According to the present invention, a sub-master tape stores video information including control signals. The control signals have a waveform which has a first level immediately following the leading edge and lower than a second level corresponding to the normal high level, and a third level immediately following the trailing edge and higher than a fourth constant level corresponding to the normal low level.

The first- and third-level waveform "buffers" thus created tend to suppress the spike noise conventionally occurring at the leading and trailing edges of the reproduced control signal and ensure more reliable tracking, tape speed control and so forth.

The first-level and third-level steps in the control signal recorded on the sub-master tape are generated by decrementing or incrementing the peak level immediately following the leading or trailing edges of the rectangular control signal respectively.

According to one aspect of the invention, a sub-master tape for high-speed contact printing for duplicating video information onto a slave tape is characterized by video information copied from a master tape and including a control signal which is generally made up of rectangular pulses of alternating upper and lower peak levels, the control signal having a first level immediately following the leading edge of the control signal, a second level following the first level and corresponding to the upper peak level of the control signal, a third level immediately following the trailing edge of the control signal, and a fourth constant level following the third level and corresponding to the lower peak.

Preferably, the first level is held constant for a first given period and the third level is held constant for a second given period. The first level is further preferably held constant at a level a first given amplitude lower than the second level for the first period and the third level is held in constant at a level a second given amplitude higher than the fourth level for the second period.

In the alternative, the first level varies from a level that is a first given amplitude lower than the second level to the second level over the first period, and the third level varies from a level that is a second given amplitude higher than the fourth level to the fourth level during the second period.

In the modification, the control signal further has a fifth level higher than the fourth level and immediately preceding the leading edge of the control signal, and a sixth level lower than the second level and immediately preceding the trailing edge of the control signal. Similarly to the foregoing first and third levels, the fifth level may be held constant at a level that is a third given amplitude higher than the fourth level for a third period, and the sixth level may be held in constant at a level that is a fourth given amplitude lower than the second level for a fourth period. In the alternative, the fifth level varies from a level a third given amplitude higher than the fourth level to the fourth level over a third given period, and the sixth level varies from a level that is a fourth given amplitude lower than the second level to the second level over a fourth given period.

According to another aspect of the invention, a method for recording a control signal on a sub-master tape for high-speed contact printing for duplicating video information including the control signal onto a slave tape, which control signal is of pulse form having alternating first upper and second lower levels, is characterized by providing a third level lower than the first level immediately following the leading edge of each control signal pulse, and providing a fourth level higher than the second level immediately following the trailing edge of each control signal pulse.

The method comprises the step of producing a negative signal having a constant amplitude and a given first duration in response to the leading edge of the control signal pulse, superimposing the negative signal on the control signal pulse in order to produce the third level lower than the first level to an extent corresponding to the amplitude of the negative signal, and the step of producing a positive signal having a constant amplitude and a given second duration in response to the trailing edge of the control signal pulse, and superimposing the positive signal on the control signal pulse in order to provide the fourth level higher than the second level to an extent corresponding to the amplitude of the positive signal.

According to a further aspect of the invention, a device for recording a control signal on a sub-master tape use in high-speed contact printing for duplicating video tape recorder signal data including control signal data onto a slave tape, comprises a magnetic head for recording the control signal data on the sub-master tape, an input terminal receiving a rectangular control signal pulse having alternating upper first and lower second levels, a first signal generator responsive to the leading edge of the control signal pulse to produce a first signal having a first given negative amplitude, a second signal generator responsive to the trailing edge of the control signal pulse to produce a second signal having a second given positive amplitude, and means for superimposing the first and second signals on the control signal pulse and thus producing a third level lower than the first level by the first amplitude immediately following the leading edge and a fourth level higher than the second level by the second amplitude immediately following the trailing edge.

Preferably, the first signal generator sustains the first signal for a given first period, and the second signal generator sustains the second signal for a given second period.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIGS. 3(A) to 3(E) show waveforms of various modifications to the control signals to be recorded on the sub-master tape.

DESCRIPTION OF THE PREFERRED EMBODIMENT

Figure 1:
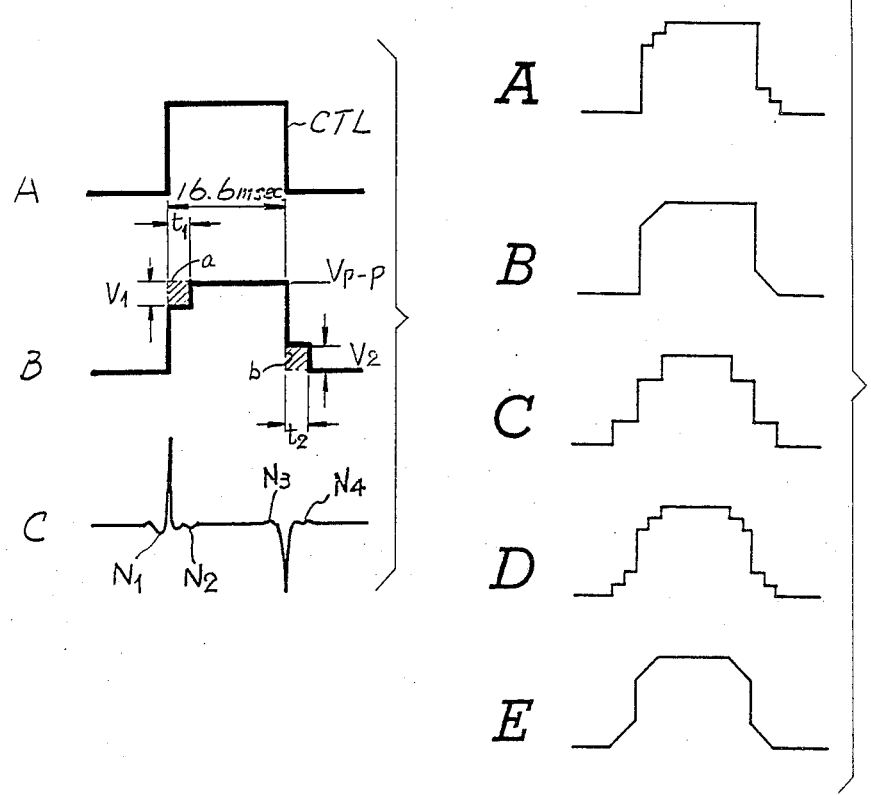
FIGS. 1(A) to 1(C) show waveforms of a control signal on a master tape, a control signal duplicated on a sub-master tape, and a control signal reproduced from a duplicated slave tape.

Referring now to the drawings, FIGS. 1(A) to 1(C) respectively show the waveforms of control signals recorded on a master tape, on a sub-master tape and control signals reproduced from a slave tape. As seen from FIG. 1(A), the master tape holds the control signal in a rectangular waveform which is recorded together with other video information. The mirror sub-master tape is duplicated from the master. However, the control signals on the sub-master tape are re-formed as shown in FIG. 1(B). Each control signal pulse to be recorded on the sub-master tape is missing the area a which corresponds to dropping the high signal level by a desired upper peak level drop $V_1$ for a period of time $t_1$ following the leading edge, and a matching area b which corresponds to a boost of the low signal level by a desired lower peak level rise $V_2$ for a period of time $t_2$ following the trailing edge. These areas a and b in the control signal waveform on the sub-master tape serve to lower the amplitude of spike noise components $N_1$, $N_2$, $N_3$ and $N_4$ conventionally produced at the leading and trailing edges of the differentiated control signal spikes reproduced from the slave tape as shown in FIG. 1(C). By selecting the areas a and b appropriately the resulting suppression of the spike noise is sufficient to prevent mistriggering during reproduction of the duplicated slave tape.

In particular, the areas a and b are effective for eliminating the spike noise components $N_2$ and $N_4$ which tend to cause mistriggering during reproduction of the duplicated slave tape.

Assuming the peak-to-peak voltage $V_{p-p}$ is $10V_{p-p}$, and the pulse width is 16.6 msec. in the rectangular-pulse control signal on the master tape, the level drop and rise $V_1$ and $V_2$ of the control signal to be recorded on the sub-master tape should both be about 2 to 3 V. The lowered upper peak level at the leading edge and raised lower peak level at the trailing edge of the control signal should be held constant for the periods $t_1$ and $t_2$, which may both be about 1.3 msec.

Figure 2:
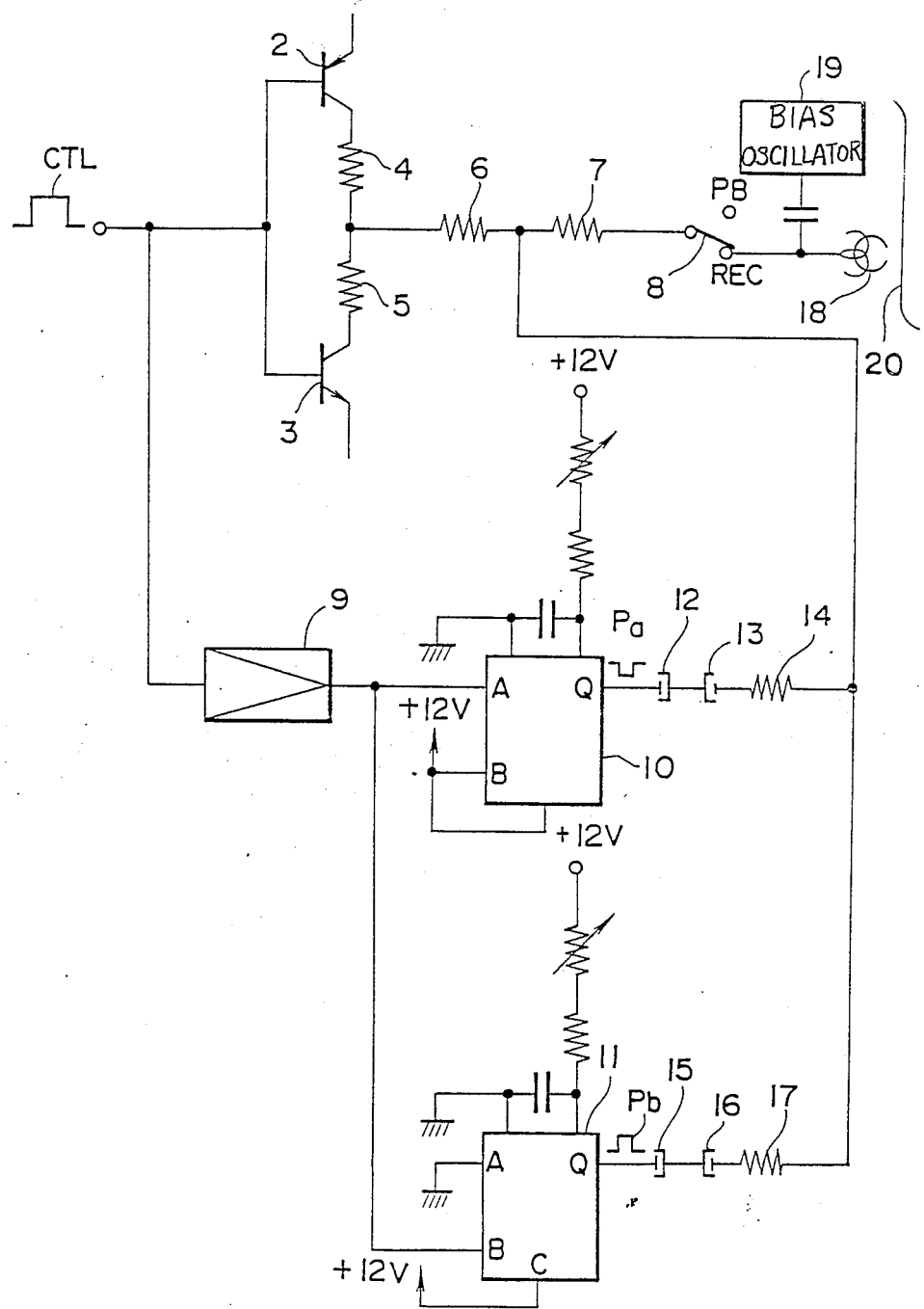
FIG. 2 is a circuit diagram of a control signal recording circuit for recording the control signal onto the sub-master tape.

FIG. 2 shows a circuit designed to record the control signal with this modified waveform onto the sub-master tape. The circuit has an input terminal 1 which receives 30-hz control signals with 50% duty cycles. The control signals input through the input terminal 1 are applied to base electrodes of transistors 2 and 3. Thus, the control signal render the transistors 2 and 3 conductive alternatingly so that the control signal is amplified by resistors 4 and 5 connected across their collector electrodes. The output of the transistors 2 and 3 is applied to a switch 8 through the resistors 4 and 5 and other serial resistors 6 and 7.

The control signal from the input terminal 1 is also fed to monostable multivibrators 10 and 11 through a buffer amplifier 9. The monostable multivibrator 10 is designed to be triggered by the leading edge of the control signal and has a time constant adjusted to match the period $t_1$. This monostable multivibrator 10 is designed to output a pulse corresponding to the area a in the control signal to be recorded on the mother tape. Conversely, the monostable multivibrator 11 is designed to be triggered by the trailing edge of the control signal from the input terminal 1 and has a time constant corresponding to the period $t_2$. This monostable multivibrator 11 is designed to generate the area b in the control signal to be recorded on the sub-master tape.

The monostable multivibrator 10 is connected to the junction between the resistors 6 and 7 through capacitors 12 and 13 and a resistor 14, all connected in series. The monostable multivibrator 11 is also connected to the junction between the resistors 6 and 7 through similar capacitors 15 and 16 and resistor 17. The monostable multvibrator 10, when triggered, produces a negative pulse $P_a$ of amplitude $-V_1$. The negative pulse $P_a$ produced by the monostable multivibrator 10 continues low for the period $t_1$ corresponding to the time constant of the monostable multivibrator 10. On the other hand, the monostable multivibrator 11, when triggered, produces a positive pulse $P_b$ of amplitude $V_2$. The positive pulse $P_b$ is maintained for the period $t_2$ corresponding to the time constant of the monostable multivibrator 11.

The outputs of the monostable multivibrators 10 and 11 are superimposed on the control signal, resulting in the waveform shown in FIG. 1(B). The control signal thus produced is sent to a recording head 18 through the recording terminal REC of the switch 8 for recording on the sub-master tape 20 together with a bias signal from a bias oscillator 19.

FIGS. 3(A) to 3(E) show some possible modifications to the waveform of the control signals to be recorded on the sub-master tape. In the modification of FIG. 3(A), the control signal level rises stepwise following the leading edge to the upper peak value and drops stepwise following the trailing edge to the lower peak value. In the modification of FIG. 3(B), the control signal level rises linearly and drops linearly.

The modifications of FIGS. 3(C) to 3(E) are intended to eliminate not only the spike noise $N_2$ and $N_4$ but also the spike noises $N_1$ and $N_3$. In order to eliminate the spike noises $N_1$ and $N_3$, the signal level rises before the leading edge of the control signal and drops before the trailing edge of the control signal. This successfully suppresses the spike noises $N_1$ and $N_3$.

In order to provide the waveforms of FIGS. 3(C) to 3(E), additional monostable multivibrators may be provided in the circuit of FIG. 2.

It should be appreciated that the control signal is recorded on the sub-master tape at magnetic saturation at the upper peak level of the control signal.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A sub-master tape for high-speed contact printing for duplicating video information onto a slave tape, characterized by video information copied from a master tape and including a control signal which is made up of rectangular pulses of alternating upper and lower peak levels, each pulse having respective leading and trailing edges, said control signal having a first level immediately following the leading edge of each pulse of the control signal, a second level immediately following said first level and corresponding to said upper peak level of said control signal pulses, said second level being higher than said first level, a third level immediately following the trailing edge of each pulse of the control signal, and a fourth level immediately following said third level and corresponding to said lower peak level of said control signal pulses, said fourth level being lower than said third level.

2. A sub-master tape as set forth in claim 1, wherein said first level is held constant for a first given period and said third level is held constant for a second given period.

3. A sub-master tape as set forth in claim 2, wherein said first level is held constant at a level a first given amplitude lower than said second level for said first period and said third level is held constant at a level a second given amplitude higher than said fourth level for said second period.

4. A sub-master tape as set forth in claim 1, wherein said first level varies for a first given period from a first given amplitude lower than said second level to said second level over said first period, and said third level varies for a second given period from a second given amplitude higher than said fourth level to said fourth level during said second period.

5. A sub-master tape as set forth in claim 3, wherein said control signal further has a fifth level higher than said fourth level and immediately preceding said leading edge of said control signal, and a sixth level lower than said second level and immediately preceding said trailing edge of the control signal.

6. A sub-master tape as set forth in claim 5, wherein said fifth level is held constant at a third given amplitude higher than said fourth level for a third period, and said sixth level is held constant at a fourth given amplitude lower than said second level for a fourth period.

7. A sub-master tape as set forth in claim 4, wherein said control signal further has a fifth level higher than said fourth level and immediately preceding said leading edge of said control signal, and a sixth level lower than said second level and immediately preceding said trailing edge of the control signal and said fifth level varies from a third given amplitude higher than said fourth level to said fourth level over a third given period, and said sixth level varies from a fourth given amplitude lower than said second level to said second level over a fourth given period.

8. A method for recording a control signal on a sub-master tape for high-speed contact printing for duplicating video information including said control signal onto a slave tape, which control signal is of pulse form having alternating first upper and second lower levels, each pulse having a respective leading edge and a trailing edge, characterized by providing a third level lower than said first upper level immediately following the leading edge of each control signal pulse and before said first level, and providing a fourth level higher than said second lower level immediately following the trailing edge of each control signal pulse and before said second level.

9. A method as set forth in claim 8, in which said step of providing a third level comprises the step of producing a negative signal having a constant amplitude and a given first duration in response to the leading edge of the control signal pulse, superimposing said negative signal on said control signal pulse in order to produce said third level lower than said first upper level to an extent corresponding to the amplitude of said negative signal, and said step of providing a fourth level comprises the step of producing a positive signal having a constant amplitude and a given second duration in response to said trailing edge of said control signal pulse, and superimposing said positive signal on said control signal pulse in order to provide said fourth level higher than said second lower level to an extent corresponding to the amplitude of said positive signal.

10. A method as set forth in claim 9, which is further characterized by providing a fifth level immediately preceding said leading edge, which fifth level is higher than said second level and by providing a sixth level immediately preceding said trailing edge, which sixth level is lower than said first level.

11. A device for recording a control signal on a sub-master tape used in high-speed contact printing for duplicating video tape recorder signal data including control signal data onto a slave tape, comprising:
 a magnetic head for recording said control signal data on said sub-master tape;

an input terminal receiving a rectangular control signal pulse having alternating upper first and lower second levels;

a first signal generator responsive to the leading edge of said control signal pulse to produce a first signal having a first having a first given negative amplitude;

a second signal generator responsive to the trailing edge of said control signal pulse to produce a second signal having a second given positive amplitude; and means for superimposing said first and second signals on said control signal pulse and thus producing a third level lower than said first level by said first given negative amplitude immediately following said leading edge and a fourth level higher than said second level by said second given positive amplitude immediately following said trailing edge.

12. A device as set forth in claim 11, wherein said first signal generator sustains said first signal for a given first period.

13. A device as set forth in claim 12, wherein said second signal generator sustains said second signal for a given second period.

* * * * *